United States Patent [19]

Jeswine

[11] Patent Number: 4,562,623

[45] Date of Patent: Jan. 7, 1986

[54] RELEASE MECHANISM

[76] Inventor: William W. Jeswine, P.O. Box 1287, Issaquah, Wash. 98027

[21] Appl. No.: 504,381

[22] Filed: Jun. 15, 1983

[51] Int. Cl.$^4$ .............................................. B64D 17/32
[52] U.S. Cl. ...................................... 24/573; 24/306; 24/602; 24/643; 244/151 B
[58] Field of Search ................. 24/573, 574, 306, 643, 24/644, 645, 115 F, 602; 244/151 A, 151 B

[56] References Cited

U.S. PATENT DOCUMENTS

| | | | |
|---|---|---|---|
| 2,481,116 | 9/1949 | Horning | 244/151 A |
| 2,746,116 | 5/1956 | Craven | 24/265 AL |
| 2,829,414 | 4/1958 | Thomas | 24/265 AL |
| 2,839,809 | 6/1958 | Warner et al. | 24/265 AL |
| 2,914,273 | 11/1959 | Bolton et al. | 244/151 A |
| 3,237,264 | 3/1966 | Turolla | 24/201 R |
| 3,561,706 | 6/1968 | Martin | 244/149 |
| 3,617,019 | 11/1971 | Femia | 24/201 R |
| 3,744,102 | 7/1973 | Gaylord | 244/151 A |
| 3,744,103 | 7/1973 | Gaylord | 24/603 |
| 3,934,848 | 1/1976 | Snyder | 24/201 R |
| 4,030,689 | 6/1977 | Rodriguez | 244/151 B |
| 4,428,102 | 1/1984 | Brownell | 24/574 |

FOREIGN PATENT DOCUMENTS

532950 11/1921 France .
282767 8/1962 Netherlands .
2066346 11/1979 United Kingdom .

Primary Examiner—Philip C. Kannan
Attorney, Agent, or Firm—Seed and Berry

[57] ABSTRACT

A release mechanism is provided for releasably joining two objects such as straps, cables, ropes, or the like as well as two rigid members such as pipes, tubing, beams, columns, or the like. The mechanism is usable for releasing loads which are under tension and, in certain embodiments, also transmit compression and torsional forces. One mechanism includes a pair of pivoting plates connected to the ends of a bifurcated strap. The plates engage elongated surfaces on a root member connected to an opposite strap. An indexing arrangement is provided to prevent relative sliding movement. The plates are biased for outward movement. Outward movement is prevented by releasable securement links or straps. An alternative form of securement is provided in the form of a sliding enclosure. An alternative embodiment for flexible or rigid members is provided in the form of a central root surrounded by outwardly pivoting leaves. Pivoting members connected to the leaves engage projections on the root member. A latch and release mechanism controls the movement of the leaves. A rope release mechanism has a pair of plates received by a transverse root connected to one rope. The plates are connected to the bifurcated end of the other rope. The root has a circumferential groove which receives a rubber band which releasably secures the bifurcations. The ends of the plates are releasably secured together.

43 Claims, 19 Drawing Figures

RELEASE MECHANISM

SUMMARY OF THE INVENTION

A release mechanism in various embodiments is provided for releasably joining two objects such as straps, cables, ropes, or the like as well as two rigid members such as pipes, tubing, beams, columns, or the like.

The preferred embodiment is most advantageously used for connecting straps such as those found in a parachute harness.

The bifurcated ends of one strap are each connected to a pivoting rigid plate. Recesses are provided in the plates to receive and protect the straps connected to the release mechanism.

A rigid root member, formed of two separate elements, captively secures the end of the other strap. Rivets hold the two elements together and further help to secure the strap. Sidewalls are provided on the ends of the root and define channels which confine the connecting straps. The root has a wedge-shaped cross section on the side opposite the strap to which it is connected.

Elongated contact surfaces on the plates engage elongated contact surfaces on the root. Indexing projections on the plates mate with receiving slots on the root on the contact surfaces.

The plates are biased, with an elastic strip, for outward rotation from their engaged position. Such outward rotation is prevented through the use of a flexible link passing through grommets secured to the straps connected to the plates. Withdrawal of cable ends passing through opposite ends of the flexible link are used to trigger release of the connected straps.

A second embodiment of the strap release mechanism has a root member which has a generally triangular cross section. The root member has a projection which extends oppositely from a wedge-shaped surface. The projection supports a bar about which the connecting strap is fastened.

A third embodiment of the strap release mechanism has a root member which has elongated transverse grooves which receive curved edges of mating plates. An indexing pin passes through the root member and mates with notches located along the contacting edges of the plates.

A fourth embodiment of the strap release mechanism utilizes a sliding enclosure. The enclosure is slid along a strap to allow pivoting plates to pivot outwardly permitting the connected straps to separate.

A fifth embodiment of the strap release mechanism utilizes a circumferential transverse strap with releasably connected ends to hold the plates in their engaged position.

A cable release mechanism has a central body which is connected to one cable. A series of rigid leaves are pivotally connected around the outside of the central body. The inner surfaces of the leaves contact a root member which is connected to the opposite cable. Projections extend outwardly from the wall of the root member. Surfaces of the projections are contacted by the ends of pivoting members. The pivoting members are each connected pivotally within a slot in a corresponding leaf. A latching mechanism secures the leaves against outward movement. The latching mechanism includes a provision for forcing the leaves outward upon actuation of a remote release control.

An electrical connector mechanism includes a multiple lever arrangement which prevents outward movement of the leaves. When the mechanism is actuated it forces the leaves outward.

A rope release mechanism includes a transverse root member having receiving grooves in its surface. Pivoting plates are connected to a bifurcated end of the opposite rope. The ends of the plates are received in the grooves in the root. The upper ends of the plates are secured together by a releasable connection. The root has notches in its opposite ends which receive intermediate sections of the bifurcated rope. The rope sections are releasably held in the notches by a rubber band. The rubber band is received in a transverse groove extending around the root.

DETAILED DESCRIPTION OF THE INVENTION

INTRODUCTION

The invention involves a release mechanism for releasably joining two objects such as straps, cables, ropes, or the like as well as two rigid members such as pipes, tubing, beams, columns or the like. The mechanism is capable of releasing loads while the connecting mechanism is under tension and in certain embodiments also transmit compression forces and torsional forces. The individual embodiments are described below.

STRAP RELEASE MECHANISM, PREFERRED EMBODIMENT

Figures 1, 2:
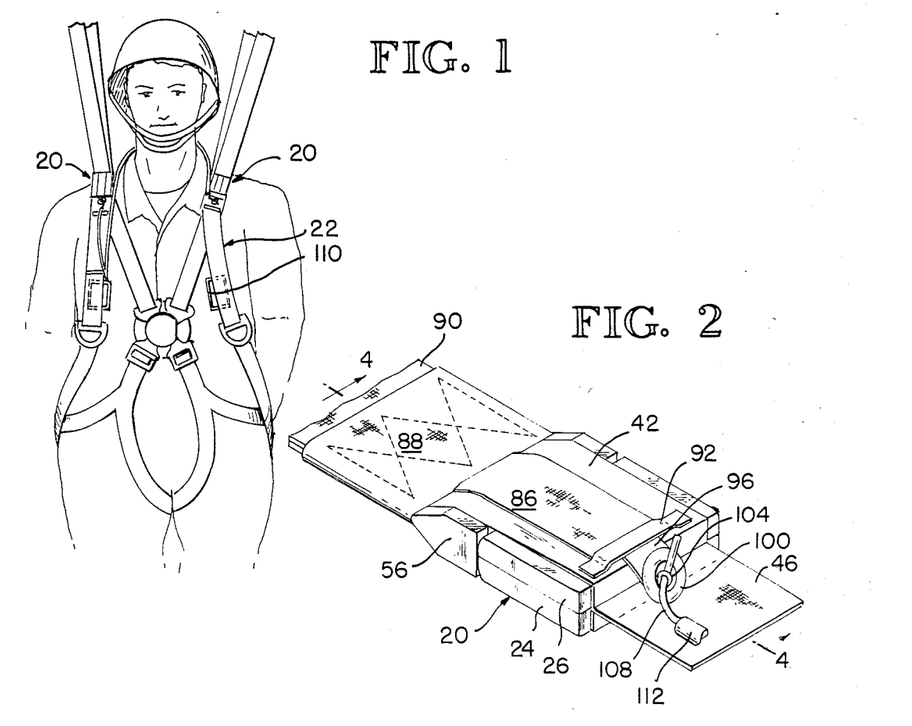
FIG. 1 is an illustration of the use of the preferred embodiment of the strap release mechanism wherein it is utilized in connection with a parachute harness.
FIG. 2 is a perspective view of the preferred embodiment of the strap release mechanism in an assembled configuration.

The preferred embodiment of a release mechanism of the type utilized for connecting straps and the like is illustrated in FIGS. 1, 2, 3 and 4. As illustrated in FIG. 1 the release mechanism 20 may be utilized to disconnect straps of the type found in a parachute harness 22 so that the user may quickly shed the parachute canopy when necessary. The release mechanism could be used at other points in the parachute assembly and in other applications than those illustrated.

Figure 4:
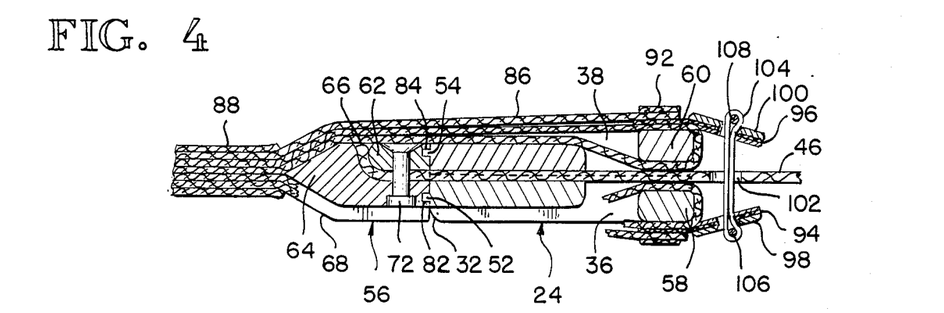
FIG. 4 is a section view of the strap release mechanism taken along the line 4—4 in FIG. 2.

The release mechanism includes, in part, a pair of rigid pivoting members such as the plates 24 and 26 shown in FIG. 2. The plates when in the engaged position are in a substantially parallel relation to each other. The plates each have an elongated pivot edge such as edges 28 and 30 respectively. Preferably the pivot edges, as best illustrated in FIG. 4, are substantially planar along their inner edge and curved away from the opposite contacting surface along the outer edge at 32 and 34 respectively. The walls of the rigid plates have slots 36 and 38 passing through them. These slots receive strap sections 40 and 42 respectively. The plates are provided with a recess or channel on their interior surface such as channel 44 on plate 26. This channel and the corresponding channel on the identically constructed plate 24 provide a passage through which strap 46 passes. The lateral edges of the plate such as edges 48 of plate 24 contact each other when the plates are in the position shown the FIG. 2.

Figure 3:
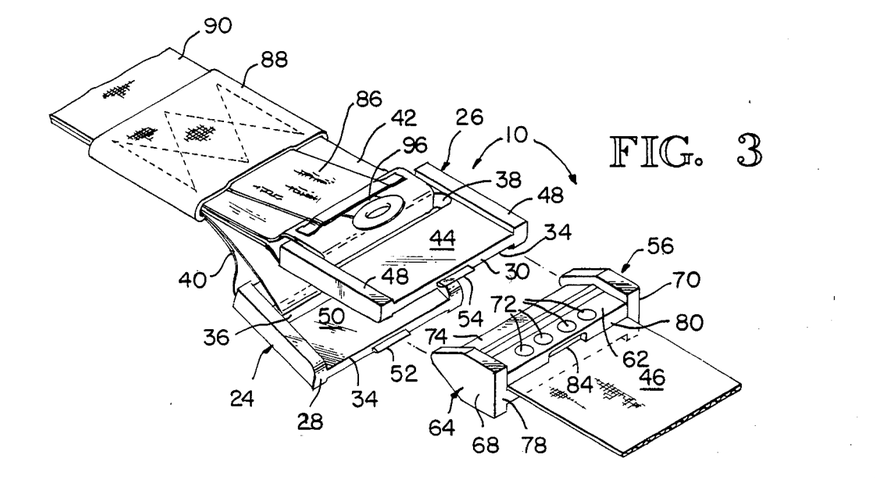
FIG. 3 is a perspective view of the preferred embodiment of the strap release mechanism in a released and separated position.

The exterior surfaces of the plates also have central recesses such as the channel 50 on plate 24 shown in FIG. 3. The recesses receive the strap to which the plate is connected when the release mechanism is in its engaged position as shown in FIG. 2.

Projections such as projections 52 and 54 extending from the interior portion of pivot edges of the plates are provided. They are received within mating slots on the root member 56 described below. The projections serve to index the plates relative to the root and prevent undesirable, relative sliding movement.

In order to accomodate the thickness of the straps 40 and 42 passing around the connection bars 58 and 60, formed above slots 36 and 38, as well as the thickness of the of strap 46 the channels on the exterior of the plates are deeper in the area of the connection bars as shown in FIG. 4.

Preferably the plates have a generally rectangular configuration.

Mating with the pivot edges 28 and 30 is a rigid root member 56. As best seen in FIG. 4 the root member is made of two metal components 62 and 64. These components when placed together form a channel which receives and captively secures the end of strap 46. The channel preferably has a flared opening 66 which helps to secure the strap. Member 62 is laterally confined within the sidewalls 68 and 70 of component 64. Rivets 72, having recessed heads, secure the components 62 and 64 together. The stems of the rivets pass through the strap to further insure its securement.

As shown in FIG. 3 sidewalls 68 and 70 extend above a central channel on either side of the root, such as, channel 74 as shown in FIG. 3. The channels receive the straps 40 and 42.

Preferably the surfaces of the root are shaped so that the root has a wedge-shaped cross section on the side opposite strap 46. Please see FIG. 4.

Preferably the length of the straps 40 and 42 and the size of the plates and root member are coordinated so that the release mechanism in its assembled configuration, as shown in FIG. 4, closely receive bifurcated straps 42 and 44.

The root has an elongated contact surface such as surface sections 78 and 80 on either side of strap 46. Preferably these contact surfaces on the root are substantially planar. The surfaces form the load bearing side of the root.

Slots 82 and 84 are positioned in the surfaces on either side of the strap to receive projections 52 and 54 respectively on the plates.

To assemble the release mechanism the root is placed centrally between the bifurcated straps 40 and 42, the free ends of the plates 24 and 26 are then pivoted inwardly on either side of the root and strap 46. The projections 52 and 54 are engaged in the corresponding slots 82 and 84 in the root. The ends of the plates in which the bars 56 and 60 are located are then pivoted together. With the plates in this position the release mechanism will handle tensile forces applied to the straps.

Preferably a mechanism is provided for encouraging the plates to rotate from their contacting positions. This may be done such as through the use of elastic strips connected to straps 40 and 42. As shown by the representative elastic strip 86, the strips have their ends secured in a pretensioned manner such as by securing one end under the reinforcing band 88 at the base of the bifurcation on strap 90 and securing the other end to strap 46 such as with securement strip 92. When the release mechanism is in the assembled configuration shown in FIG. 2 the elastic strip urges the plates 24 and 26 apart.

Tabs 94 and 96 are secured to the straps 40 and 42 near their ends. Grommets 98 and 100 are placed in the end of the tabs and provide aperatures. An opening 102 is provided through strap 46. A link having openings in either end, such as, flexible link 104 extends through the opening 102 with either end passing through the grommets 98 and 100. A pair of relative rigid members such as the ends of cables 106 and 108 extend through the openings in the ends of link 104. Until the ends of one or both of the cables are withdrawn from the link the plates are prevented from pivoting outward. The cables are actuated in the conventional manner such as by pulling ring 110 which causes the cable to move through the tubular housing 112 through which it passes.

When the release mechanism is actuated by withdrawal of one or both of the cables 106 and 108 the plates 24 and 26 are cause to pivot away from each other by the elastic strips or tension loading on the straps 46 and 90 or both.

The curved outer edge of the plates 32 and 34 permit smooth outward pivoting of the plates. If one plate pivots first, the unbalanced loading will cause the opposite plate to rapidly begin to pivot also. Once the pivoting action is started any tension on straps 46 and 90 tends to increase the speed of separation. As the plates surfaces which engage the root rotate the projection 52 and 54 on the plates are withdrawn from the slots on the root.

The flexibility of the straps 40 and 42 in their loose connection to the plates opposite the contacting surfaces permit the plates to pivot easily.

STRAP RELEASE MECHANISM, SECOND EMBODIMENT

Figure 5:
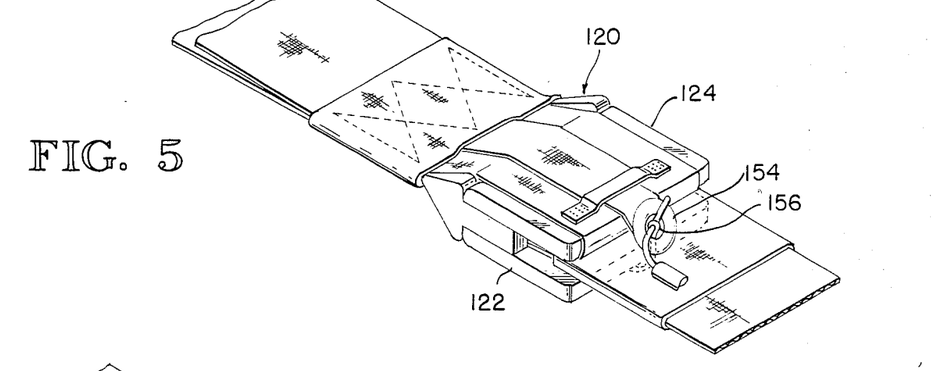
FIG. 5 is a perspective view of a second embodiment of the strap release mechanism.
Figure 6:
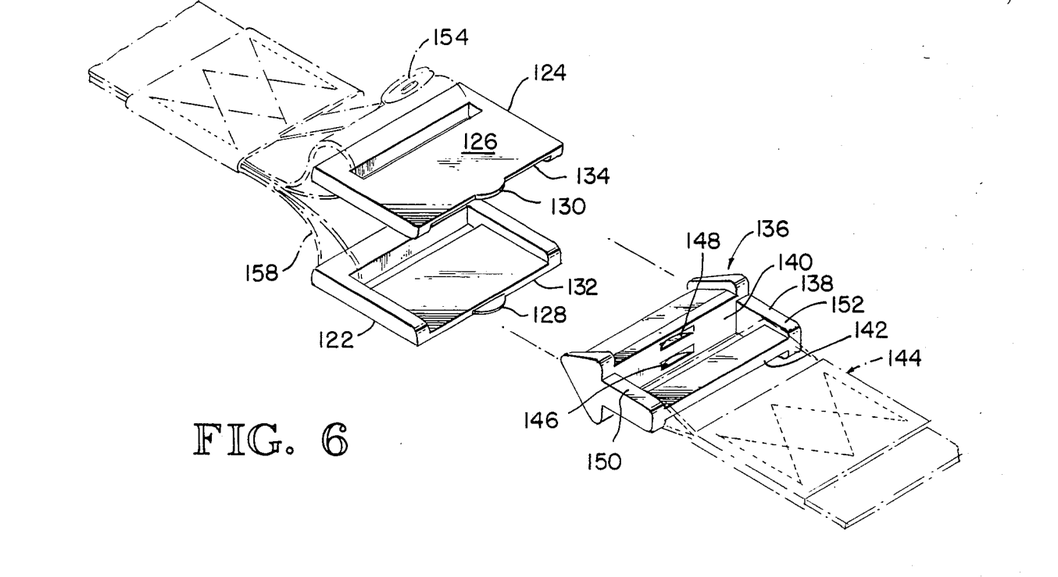
FIG. 6 is a perspective view of the embodiment of the strap releas2 mechanism illustrated in FIG. 5 showing the release mechanism in a released and separated condition. Portions of the connecting straps are shown in phantom.

A second embodiment of the release mechanism 120 is illustrated in the FIGS. 5 and 6.

Like the previous embodiment, it has a pair of pivoting plates 122 and 124. The plates peferably are rigid metal like those in the previous embodiment. The interior surfaces of the plates are preferably flat like surface on 126 shown in FIG. 6. The indexing mechanism for connecting the plates to the root includes tabs 128 and 130. The tabs have a rounded end surface. They are positioned along the interior edge of the engaging end surfaces 132 and 134.

The root 136 differs from the previous embodiment in that it has a projection 138 located centrally above the plate contacting surface 140. The projection holds a transverse connection bar 142 to which strap 144 is connected such as by looping around the bar. The contact surface has two slots 146 and 148 which receive the tabs 128 and 130 respectively. When the release mechanism is assembled as shown in FIG. 5 the lateral edges of the interior surfaces of the plates, such as surface 126, rest against the outer surfaces of the projection such as lateral surfaces 150 and 152. The projection thus holds the plates in a spaced substantially parallel relationship to each other.

In contrast to the previous embodiment the mechanism which holds the plates together has only a single grommet 154 on one side of the release mechanism. The flexible link 156 has its opposite end fasten to strap 158 which is connected to plate 122.

STRAP RELEASE MECHANISM, THIRD EMBODIMENT

Figure 7:
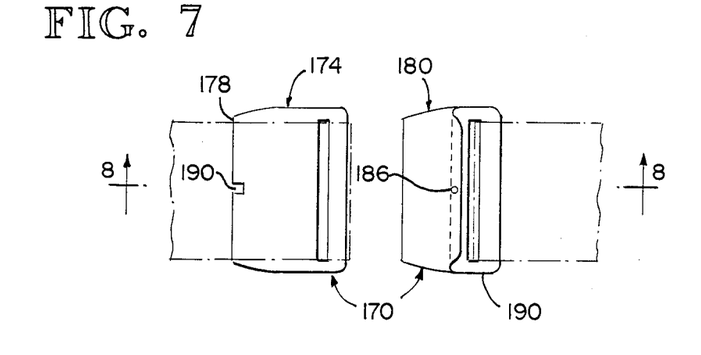
FIG. 7 is a top plan view of a third embodiment of the strap release mechanism showing the release mechanism in a released and separated position.
Figure 8:
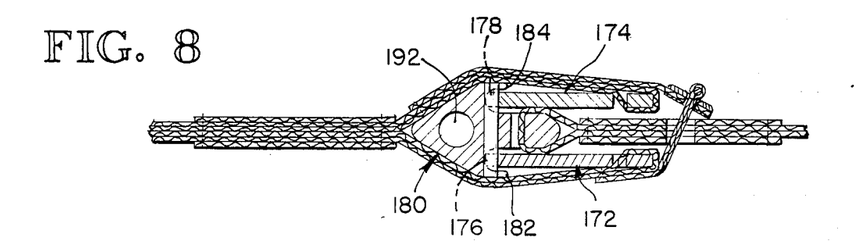
FIG. 8 is a longitudinal section view of the embodiment of the strap release mechanism shown in FIG. 7 taken along the line 8—8 in FIG. 7, but showing the release mechanism in an engaged position.

The third embodiment of the strap release mechanism 170 is illustrated in FIGS. 7 and 8.

In this version the plates 172 and 174 are flat on both surfaces. The contacting edges 176 and 178, respectively, about which they pivot are rounded as shown in FIG. 8.

The root 180 has a pair of grooves 182 and 184 which receive curved edges 176 and 178 of the plates. In order to index the plates to the root a pin 186 is press fit in a passage extending through the body. The pin is located such that it intersects the grooves 182 and 184. Notches such as notch 190 are provided along the contacting edges of the plates and straddle the pin 186.

As an alternative method of indexing the plates to the root the ends of the grooves could be enclosed on their ends.

In order to reduce the weight of the root a transverse weight reduction hole 192 may be provided.

This embodiment operates in substantially the same manner as the previous embodiments.

STRAP RELEASE MECHANISM, FOURTH EMBODIMENT

Figure 9:
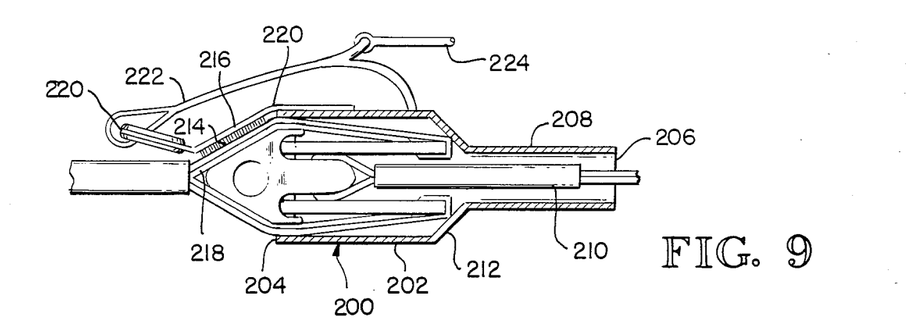
FIG. 9 is a longitudinal section view of a fourth embodiment of the strap release mechanism which uses a sliding enclosure to prevent release.

The fourth embodiment of strap release mechanism 200 is illustrated in FIG. 9.

The root and plate mechanism are illustrated to be substantially the same as the third embodiment, however structures like those of the other embodiments may be utilized.

In this embodiment a sliding enclosure 202 is utilized to keep the plates together until such time as it is desired to allow the straps to disconnect. The enclosure is preferably of metal but other material may be utilized. The enclosure completely surrounds the release mechanism and is provide with openings 204 and 206 at either end. Opening 204 is sized to closely receive the release mechanism assembly and prevent the plates from swinging outward. The enclosure is narrowed at the opposite end 208 to closely fit around strap 210 yet permits sliding movement of the enclosure along that strap. The intermediate walls 212 are preferably tapered and contact the uper ends of the plates.

To prevent movement of the enclosure from a position preventing pivoting movement of the plates, a securement mechanism is provided. Securement may take a form of a pair of mating fabric strips 214 and 216 such as the fastening material sold under the Velcro brand and described in U.S. Pat. No. 2,717,437. Strip 216 is secured to a strap 220 which connects at one end to the enclosure 218 and has a projecting end to which is fastened the grommet 220. Cord 222 has one end secured through grommet and another end secured to the enclosure. An actuating line 224 is connected centrally to the cord.

In order to actuate the release mechanism cord 224 is pulled to separate the mating strips 214 and 216. The enclosure is then slid along strap 210 away from the release mechanism by continued force on line 224. When the opening 204 has cleared the plates they will be permitted to pivot freely outward.

STRAP RELEASE MECHANISM, FIFTH EMBODIMENT

Figure 10:
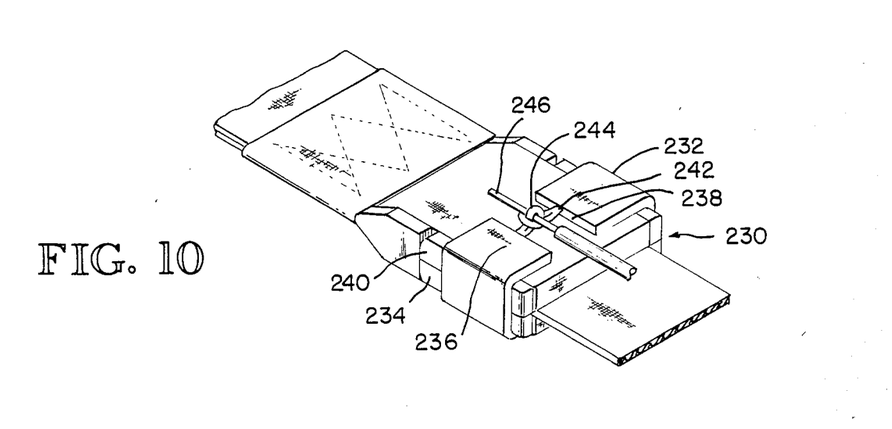
FIG. 10 is a perspective view of a fifth embodiment of the strap release mechanism illustrating an alternative method of captively holding the plates together to prevent release.
Figure 11:
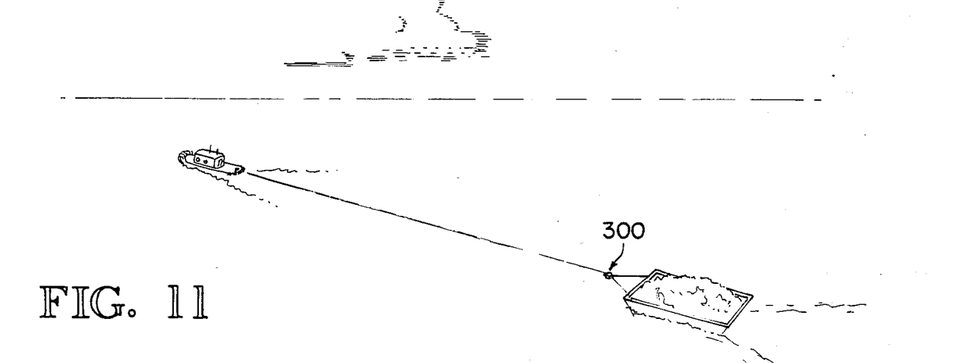
FIG. 11 is a perspective view of a tug and barge illustrating the environment of a cable release mechanism.
Figure 12:
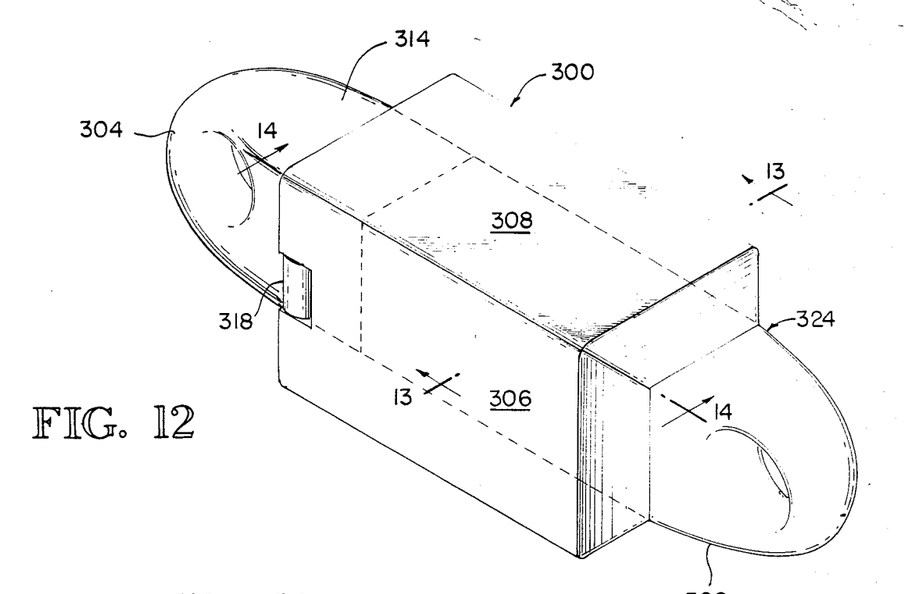
FIG. 12 is a perspective view of the cable release mechanism.
Figure 13:
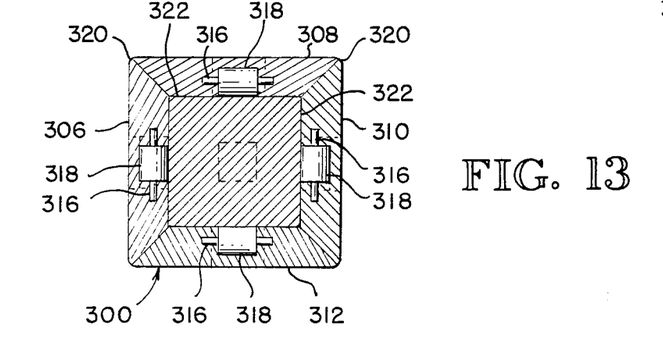
FIG. 13 is a transverse section view of the cable release mechanism taken along the line 13—13 in FIG. 12.

The fifth embodiment of the strap release mechanism 230 is illustrated in FIG. 10.

In the illustration the plate and root assembly are shown similar to that for the first embodiment but this version may work equally well with the root and plate mechanism shown in the other embodiments.

In this embodiment the plates are captively held together by a tranverse strap 232 secured centrally to the bifurcated strap member connected to the plate 234. The ends of the strap 236 and 238 are releasably secured together after the strap is wrapped about plates 234 and 240. The ends of the strap are releasably fastened together. The fastening mechanism may include a two flexible links 242 and 244 each connected to an end of the strap. Each of the links have openings in their end. One link passes through the other and then is fastened such as by a relatively rigid member such as the sliding cable 246 illustrated. The cable passes through the opening in the end of link 246. In order to release the mechanism the cable is withdrawn permitting the two ends of the strap to separate.

CABLE RELEASE MECHANISM, FIRST EMBODIMENT

FIGS. 11 through 15 illustrate a version of the release mechanism particularly suited for use with cables, ropes and rigid members such as pipes, tubing, beams, columns and the like. The application illustrated shows it used in connection with a tow cable connecting a tug to a barge. Many other applications are possible.

A release mechanism 300 includes provisions for connecting the members to be joined such as the cable eyes 302 and 304. The outside of the release mechanism is surrounded by a series of rigid leaves 306, 308, 310, and 312. The leaves are mounted in an opposing relationship to each other. They are pivotly connected to a common member such as central body 314. The leaves may be connected by pivot pins 316 passing through pivot projection 318 connected to the central body 314. The leaves are so mounted that they are able to pivot outward as illustrated by leave 312 in FIG. 14. The lateral edges of each leaf abut the adjacent leaves on either side and are preferably beveled to form the abutting surfaces 320. Although the release mechanism illustrated utilizes a rectangular structure with four leaves. The shape of the structure and the number of leaves may vary.

The inner surfaces 322 of the leaves contact the outer walls of a root member such as the member 324 connected to cable eyes 302. The contacting relationship between the outer walls of the root member and the inner surfaces of the leaves prevent relative rotation of the release mechanism components. This permits this type of release mechanism to be utilized in connection with beams, columns, pipes, electrical connectors or other structures where torsional forces are to be transmitted between the two members to be joined.

Longitudinal compressive forces may be transmitted by the release mechanism also since end 326 of the central body abuts the end 328 of the root member.

In order to trasmit tensile forces between the members joined by the release mechanism engaging surfaces, such as surfaces 330 on projection 332, contact rigid pivoting members, such as pivot member 334, which in turn connect to the leaves.

Figure 14:
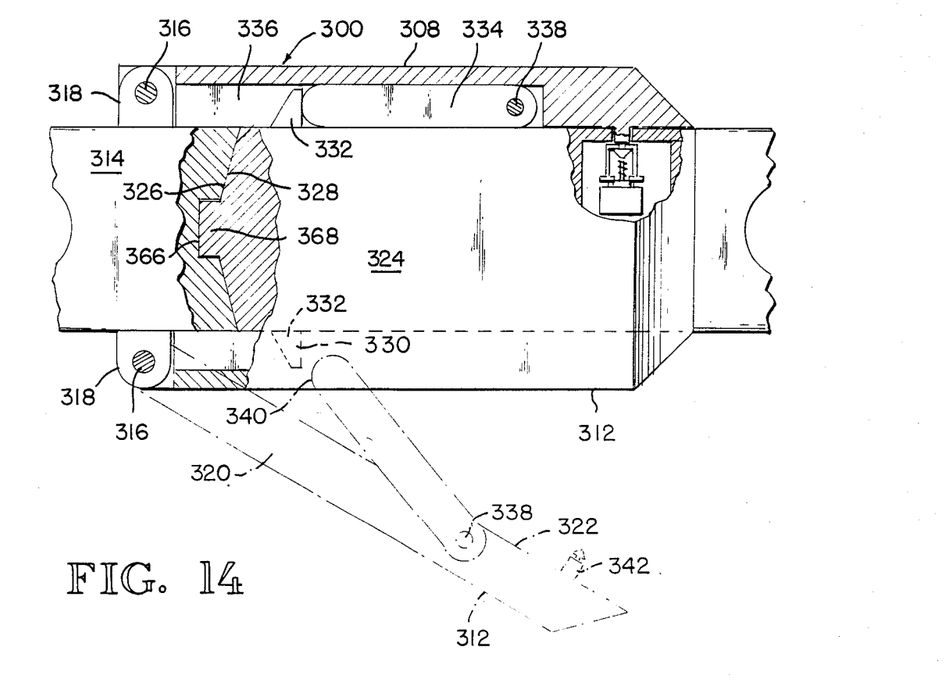
FIG. 14 is a side elevation view of the cable release mechanism with parts broken away and with one leaf, shown in phantom, illustrated in a partially disengaged position.

The leaves are provided with recesses 336, preferably centrally located in each leaf in which the pivot members are mounted. The pivot members can be mounted such by pins 338. The ends of the pivot members opposite the pivot pins 338 have engaging surfaces 340 which are preferably curved when viewed from the side as illustrated in FIG. 14. These engaging surfaces contact surfaces 330 of the projections 332. Preferably the engaging surface 330 is planar and normal to the surface of the planar sidewalls of the root.

When the leaves are folded against the walls of the root member, as shown by leave 308 in FIG. 14, the projections 332 extend into the recesses of the corresponding leaves and engage the ends of the pivot members 334. Through pin 338 the forces are transmitted to the leaves. The leaves then transmit the force through pivot pin 316 through central body 314 and to the opposite member to be joined. Forces are transmitted in the opposite direction in a corresponding manner.

The tendency of the leaves to move inward or outward under tension loading is dependent on the relative lateral positioning of the connections of the leaves, such as pin 316, the pivot connection of the pivoting members, such as pins 338, and the point of contact between surfaces 330 and 340. The relationship of these features may be altered so that leaves have a tendency alternatively to move inward, to neither move inward nor outward or to move outward. The choice depends on the application. These principles apply to the other embodiments in an analogous manner.

Figures 15, 16:
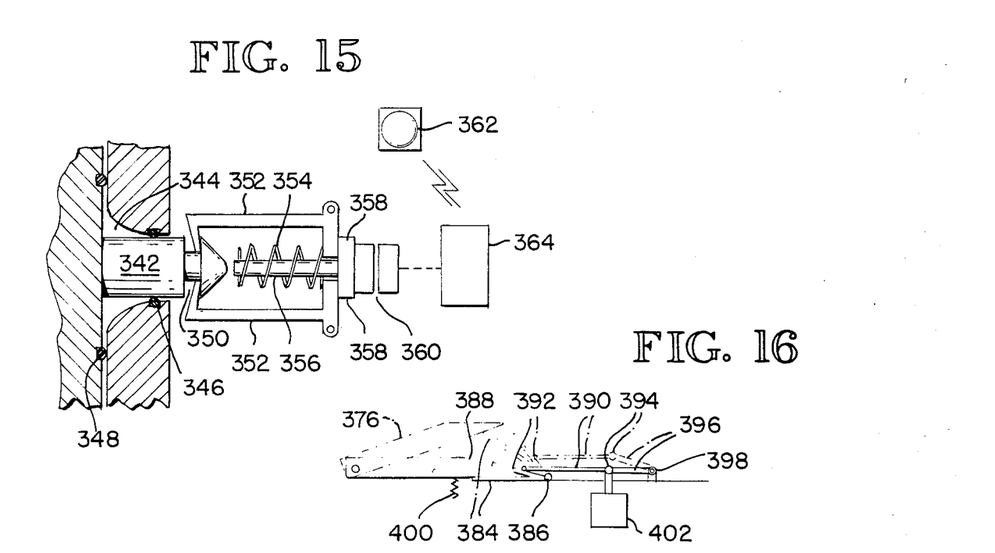
FIG. 15 is an enlarged section view illustrating schmatically a latching and releasing mechanism which secures the leaves and may be remotely actuated to release the leaves.
FIG. 16 is a partial side elevation view of an electrical connector release mechanism illustrating a latching mechanism which secures the leaf of the release mechanism and forces it outward when actuated as shown in phantom.

In order to prevent the leaves from moving outward except when desired and to then force them to move outward, a securement mechanism such as illustrated in FIGS. 14 and 15 may be provided. In the preferred form, as illustrated in this preferred version of the cable connection mechanism, the leaves are provided with projecting tabs 342. The projecting tabs are received in openings 344 in the wall of the root 324. These openings maybe sealed such as through the use of o-rings 346 and 348. The projecting tabs have notches or the like such as the circumferential groove 350 illustrated. The grooves receive the heads of pivoting latching arms 352. The head of the latching arms are urged in engagment with the groove and maintained there by a biasing mechanism such as spring 354. The head of the projection is tapered to urge the heads of the latching arms apart upon the initial entry of the projection through hole 344. In order to release the projection a push rod 356 having shoulder 358 is utilized. A mechanism for urging the push rod toward the projection is provided. By way of illustration the piezoelectric device 360 may be utilized. Upon actuation of the piezoelectric device the shoulder 358 causes the latch arms to pivot away and release the head of the projection while the rod engages the head of the projection forcing it outward.

To remotely actuate the release mechanism a transmitter 362 can be provided which sends a signal to a receiver/controller 364 which in turn activates the piezoelectrice device.

The abutting ends of the central body 314 and the root 324 preferably include a keying mechanism such as rectangular slot 366 and rectangular projection 368 which fits into slot 366.

ELECTRICAL CONNECTOR RELEASE MECHANISM

Figure 17:
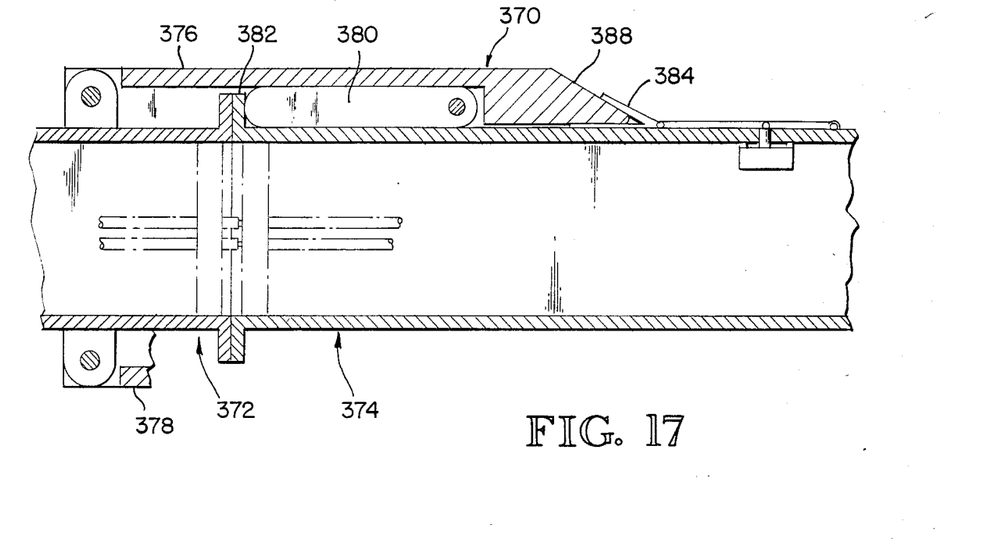
FIG. 17 is a longitudinal section view of the electrical connector release mechanism.

FIGS. 16 and 17 illustrate an electrical connector release mechanism 370. This release mechanism is a variation of the previous embodiment and is shown utilized in connection with rigid tubular structures such as elecrical connector housings 372 and 374. The application of the release mechanism to other rigid tubular structures would be similar.

The release mechanism has two or more pivoting leaves 376 and 378 that operate generally as those found in the previous embodiment. The leaves include a recess which receives rigid pivoting members such as pivot member 380. In this embodiment the projection which engages the end of the pivot member 380 is formed by flange 382 on the end of the connector.

In contrast to the previous embodiment, the leaf securement mechanism includes a series of levers. A forked assembly 384 is pivotally connected at the hinge 386 to the wall of the connector housing 374. The innermost member fits between the end of the leaf and the housing wall. The outer member is shorter and engages the top surface 388 at the end of the leaf. A rigid lever arm 390 is connected at 392 to the forked assembly. It is pivotally connected at its opposite end 394 to another lever arm 396. The opposite end of this arm is rigidly secured in a pivot connection 398 to the wall of connector housing 374. When the leaf is swung inward against the connector housing wall, it is prevented from swinging outward, as urged either by tension placed on the release or by spring 400 shown in FIG. 16, by the lever assembly. The lengths of the members are chosen such that an over center latch is formed with the lever connections at 394 of lever 390 being forced inward against the connector wall to create a stable static state in the mechanism. In order to actuate the release mechanism the end of the lever 394 is forced outwards, such as by the use of a solenoid or other device such as the piezoelectric device 402 illustrated. When the end 394 is forced outward, this causes the fork assembly to rotate upward releasing the leaf from under the top lever 392 and forcing it upward by the pivoting action of lever 384. The piezoelectric device may be actuated remotely or locally as desired.

ROPE RELEASE MECHANISM

Figure 18:
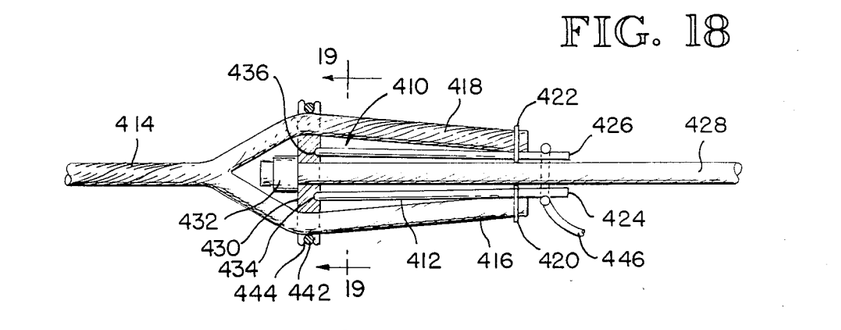
FIG. 18 is a side elevation view of a rope release mechanism.
Figure 19:
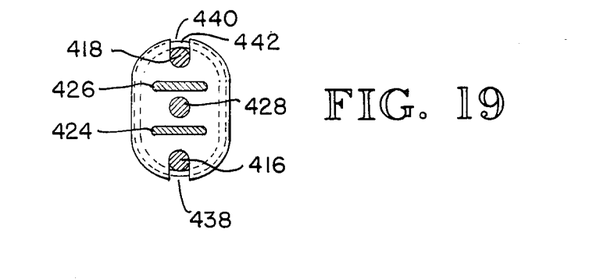
FIG. 19 is a transverse section view of the rope release mechanism taken along the line 19—19 in FIG. 18.

FIGS. 18 and 19 illustrate an embodiment of the invention in the form of a rope release mechanism 410. The release mechanism may be utilized for connecting ropes, cables and the like. A rope 414 is provided with bifurcated ends 416 and 418. The ends are connected, such as through the use of clamps 420 and 422, near the ends 424 and 426 of the rigid pivoting members 412. For purposes of illustration the rigid pivoting members are shown shorter in length than they would preferably be. An opposite rope 428 passes through a transverse root member 430 and is held on the end of the rope by clamp 432. The root member has grooves 434 and 436 which receive the curved ends of the pivoting members 412 and 410. The ends of the root member are provided with grooves 438 and 440 for receiving the ropes 416 and 418 respectively. A mechanism for holding the ropes within the grooves is provided such as in the form of the elastic band 442 which fits in circumferential groove 444 extending around the root. This band keeps the ropes within the grooves when the ropes 414 and 428 are not under tension. In order to hold the plates in their relationship adjacent rope 428, a releasable securement such as tie 446 is wrapped about the ends 424 and 426 of the pivoting members and the rope 428. To release the mechanism, the tie is released to permit the pivoting members to pivot outwardly causing the ends of the plates to fall out of the grooves 434 and 436. As the plates swing outward the band 444 is forced out of the shallow groove 444. It thus fails to further restrict the outward movement of rope ends 416 and 418. Because of its positioning the band is captively maintained around rope 414 near the base of the bifurcation.

I claim:

1. A release mechanism for releasably joining two objects comprising;
   a. a first rigid pivoting member pivotable about a first end;
   b. a second rigid pivoting member positionable in a substantially parallel relation to and opposite the first rigid member and pivotable about a first end;
   c. a rigid root member having at least a portion thereof adjacent to the first ends of the first and second pivoting members and having at least two surface sections for pivotally engaging the first ends of the pivoting members when they are in a substantially parallel relationship and for transmitting tensile forces;
   d. means for connecting the first object to be joined to the root member which is extendable between the first and second pivoting members when they are in their substantially parallel relationship with their first ends engaging the root member;
   e. means for pivotally connecting the first pivoting member at a location spaced from its first end to the second object to be joined;
   f. means for pivotally connecting the second pivoting member at a location spaced from its first end to the second object to be joined; and
   g. means for releasably securing the first and second pivoting members in their substantially parallel relationship so that upon release by the securement means the first and second pivoting members can pivot and disengage from the root member to allow separation of the joined objects.

2. A release mechanism, as in claim 1, wherein the first object to root connection means comprises a rigid structure having a plurality of flat sides and having a surface for abutting the second object to be joined; wherein the root member comprises a plurality of projections each extending outward from a wall of the first object to root connection structure and having engagement surfaces thereon to engage the first ends of the pivoting members and wherein the pivot connection means comprise a plurality of rigid leaves pivotally connected to the second object to be joined each leaf having recesses therein for receiving a pivot member connected thereto so that when the leaves are pivoted to engage the flat side of the first object to root connection structure with the ends of the pivoting members engaging the projections on the root member the two objects to be joined are prevented from separating.

3. A release mechanism, as claimed in claim 1, for connecting ropes, cables, and the like wherein the root member comprises a transverse plate having a central connection for one of the objects to be joined, a surface defining a pair of spaced grooves, one on either side of the central connection for receiving the first ends of the pivot members, and opposite ends defining outward opening grooves; wherein the connecting means for the first pivoting member comprises a first flexible line, wherein the connecting means for the second pivoting member comprises a second flexible line connected to the first to form a bifurcated end, and wherein the release mechanism further comprises means for resiliently capturing each of the bifurcated ends in one of the grooves at the opposite ends of the root.

4. A release mechanism, as claimed in claim 1, of the type for connecting straps wherein the first pivoting member has an elongated pivot edge; the second pivoting member has an elongated pivot edge; and the root member has a first elongated contact surface section along a load bearing side for engagement with the pivot edge of the first pivoting member and has a second elongated contact surface section along its load bearing side for engagement with the pivot edge of the second pivoting member.

5. A release mechanism, as claimed in claim 4, wherein the contact surface sections of the root member are substantially planar.

6. A release mechanism, as claimed in claim 5, wherein the pivot edges of the pivoting members are substantially planar along the portion of the pivot edge closest to the opposite pivoting member when they are engaged with the root and which are curved away from the contact surface of the root along an opposite portion of the pivot edge to provide freely pivoting action of the pivoting members during release.

7. A release mechanism, as claimed in claim 4, wherein the first and second pivoting members have projecting tabs along their pivot edges and wherein the root contact surface sections define slots for receivably engaging the tabs on each of the respective pivoting members to align the members with respect to the root.

8. A release mechanism, as claimed in claim 4, wherein the pivot edges of the first and second pivoting members define slots and wherein the root members have a projection extending above each of the contact surface sections to receivably engage the slot in the pivoting members to align the members with respect to the root.

9. A release mechanism, as claimed in claim 4, wherein the pivoting members each have a transverse bar spaced from their pivot edges to provide strap connections and wherein the first pivot member to second object connection means comprises a strap connected to the bar on the first pivot member and wherein the second pivot member to second object connection means comprises a strap connected to the bar on the second pivot member and having an opposite end connected to the strap which is connected to the first pivot member.

10. A release mechanism, as claimed in claim 9, wherein the first and second pivoting members have exterior surfaces which define channels which can receive the straps to maintain their alignment relative to the pivot members.

11. A release mechanism, as claimed in claim 10, wherein the root member has surfaces defining channels which can receive the straps to align the root relative to the straps.

12. A release mechanism, as claimed in claim 4, wherein the first and second pivoting members comprise plates.

13. A release mechanism, as claimed in claim 12, wherein the first object to root connection means comprises a section of strap and wherein the pivot members have a body with lateral margins which extend toward the opposite plate to engage the corresponding lateral margins on the opposite plate and define a channel through which the strap section which connects to the root member may pass.

14. A release mechanism, as claimed in claim 4, wherein the first object to root connection means comprises a section of strap and wherein the root member includes a pair of components which defines a channel for captively engaging the strap section.

15. A release mechanism, as claimed in claim 14, wherein the root member further includes means for securing the pair of components together which passes through the strap section to rigidly secure it to the root.

16. A release mechanism, as claimed in claim 4, wherein the root member includes a projection extending above the load bearing side between the contact surface sections with surfaces which define a slot through the projection to form a strap connection bar and wherein the first object to root connection means comprises a section of strap having one end secured around the bar on the root projection.

17. A release mechanism, as claimed in claim 16, wherein the root projection extends between the pivoting members to engage and separate them from each other.

18. A release mechanism, as claimed in claim 4, wherein the root member contact surface sections define concave grooves for receiving the elongated pivot edges of the pivot members.

19. A release mechanism, as claimed in claim 18, wherein the root member includes projections extending across the grooves and wherein the pivot edges of the pivot members each include a section which defines a slot for engaging the projections extending across the groove to align the engaging members.

20. A release mechanism, as claimed in claim 4, wherein the first pivoting member to second object connection means comprises a strap section connected to the pivot member, wherein the second pivoting member to second object connecting means comprises a strap section connected at one end to the pivot member and at an opposite end to the first pivot member strap to form a bifurcated strap structure.

21. A release mechanism, as claimed in claim 20, wherein the root member has a wedge shaped end and side walls which define channels on either side of the root member to closely receive the bifurcated strap structure to maintain its alignment.

22. A release mechanism, as claimed in claim 21, wherein the strap sections connected to the pivot members each include means for biasing the pivoting members to pivot away from each other and disengage from the root.

23. A release mechanism, as claimed in claim 4, wherein the pivoting member securement means comprises a slideable enclosure which closely receives the pivoting members when they are in their substantially parallel, root engaging position and prevents their pivotal movement.

24. A release mechanism, as claimed in claim 23, wherein the pivoting member securement means further comprises means for preventing the sliding movement of the enclosure from the position where it prevents pivoting movement of the pivoting members.

25. A release mechanism, as claimed in claim 4, wherein the pivoting member securement means comprises a flexible link connected to the first pivoting member opposite its first end and having an opening in the opposite end thereof, a link connected to the second pivoting member opposite its first end and having an aperature therein through which the end with the opening of first pivoting member link may pass, and a relatively rigid member which extends through the opening in the first pivoting member link to prevent its withdrawal through the aperature and preventing separation of the pivoting members until it is withdrawn.

26. A release mechanism, as claimed in claim 4, wherein the pivoting member securement means comprises a link connected to the first pivoting member opposite its first end and having an aperature therein, a link connected to the second pivoting member opposite its first end and having an aperature therein, a double ended link having openings in either end for extending through the aperatures, and a pair of relatively rigid members for extending through the openings in the opposite ends of the link to prevent withdrawal of the ends of the double ended link through the aperatures and prevent the separation of the pivoting members until removed from one or both openings.

27. A release mechanism, as claimed in claim 4, wherein the pivoting member securement means comprises a strap securable laterally around the pivoting plates and means for releasably securing the ends of the strap together to prevent the separation of the pivoting members until the strap ends are released.

28. A strap release mechanism for releasably connecting two straps comprising;
   a. a first rigid pivoting member pivotable about an elongated engagement surface at one end thereof;
   b. a second rigid pivoting member pivotable about an elongated engagement surface at one end thereof and positionable in juxtaposition with the first rigid pivoting member;
   c. a strap extendable between the first and second pivoting members when they are positioned in juxtaposition with each other;
   d. a rigid root member having body which defines a channel for receiving one end of the strap and means for securing the strap in the channel, the root member having an elongated engagement surface on either side of the channel which mates with the corresponding engagement surfaces of the two pivoting members;
   e. a strap having bifurcated ends each of which connect to a pivoting member opposite their first ends; and
   f. means for releasably securing the pivoting members in juxtaposition to each other so that upon release of the securement means the pivoting members can pivot and disengage from the root member to allow separation of the straps.

29. A strap release mechanism, as claimed in claim 28, further comprising a means for indexing the engagement surfaces of the pivoting members and the corresponding engagement surface on the root member to prevent transverse movement during engagement.

30. A strap release mechanism, as claimed in claim 29, wherein the root member and the pivoting members each have surfaces defining channels on either side of the release mechanism which closely receive the bifurcated straps and wherein the juxtaposed sides of the pivoting members have surfaces defining a channel for closely receiving the strap connected to the root member.

31. A strap release mechanism for releasably connecting two straps comprising;
   a. a first rigid pivoting member pivotable about an elongated engagement surface at one end thereof;
   b. a second rigid pivoting member pivotable about an elongated engagement surface at one end thereof and positionable in spaced juxtaposition with the first rigid pivoting member;
   c. a rigid root member having a pair of elongated engagement surfaces spaced from each other which mate with the corresponding engagement surfaces of the two pivoting members and having a projection extending between the engagement surfaces with a structure defining a slot therethrough which forms a connection bar positionable between the pivoting members;
   d. a strap which passes around the connection bar and is secured thereto;
   e. a strap having bifurcated ends each of which connect to a pivoting member opposite their first ends; and
   f. means for releasably securing the pivoting members in a position in spaced juxtaposition with each other so that upon release of the securement means the pivoting members can pivot and disengage from the root member to allow separation of the straps.

32. A strap release mechanism, as claimed in claim 31, further comprising means secured to one member of the bifurcated strap to bias the connected pivot member and means connected to the other bifurcated strap to bias the other pivot member to urge separation of the pivoting members.

33. A strap release mechanism, as claimed in claim 32, wherein the bifurcated strap closely surrounds the central portion of the root and pivoting members when pivoting members are in spaced juxtaposition.

34. A release mechanism for releasably connecting two members at their ends comprising;
   a. a plurality of rigid leaves pivotally connected in an opposing relationship to one of members to be joined adjacent its end and extending beyond such end with each leaf having an inner surface which defines a recess therein;
   b. a plurality of rigid pivoting members each pivotally connected within the recess of a leaf with a first engaging end opposite the pivot connection to extend from the recess toward the member to which it and the leaves are connected;
   c. a root member connected to the second member to be joined at its end having a plurality of planar walls against which the leaves may fold, having an end surface which abuts the end of the opposite member to which it is to be joined, having a plurality of projections extending from the walls each having an engaging surface opposite the abutting end surface so that when the leaves are folded against the walls of the root member to be joined with the engaging ends of the pivot members against the engaging surfaces of the projections and with the root abutting the end of the opposite member to be joined the ends of the members to be joined are held together; and
   d. means for releasably securing the leaves against movement away from the walls to prevent separation of the joined members.

35. A release mechanism, as claimed in claim 34, wherein the leaves completely surround the root member of the end of the abutting member to be joined and each have lateral edges which abut the lateral edges of the adjacent leaves to prevent relative rotation of the joined members.

36. A release mechanism, as claimed in claim 35, wherein the lateral edges of the leaves are beveled to form the abutting edges of the leaves which prevent relative rotation of the joined members.

37. A release mechanism, as claimed in claim 36, wherein the root member has four walls each with a projection extending from such wall, wherein there are four leaves each contacting one of the walls, and wherein there are four rigid pivoting members each pivotally connected to one of the leaves.

38. A release mechanism, as claimed in claim 34, wherein the walls have surfaces defining openings therein beneath the leaves and where the leaf securement means comprises inward projecting tabs on the leaves which extend through the openings in the walls and means for releasably securing the tabs within the openings.

39. A release mechanism, as claimed in claim 38, wherein the projecting tabs have surfaces defining notches and wherein tabs securement means comprises a pair of oppositely projecting fingers which engage the notches in the tab, means for biasing the fingers in engagement with the notches, and means for disengaging the fingers from the notches to release the leaves and permit disconnection of the joined members.

40. A release mechanism, as claimed in claim 38, wherein the leaf securement means further comprises means for ejecting the tabs from their secured positions when the joined members are to be separated.

41. A release mechanism, as claimed in claim 34, wherein the leaf securement means comprises a capturing arm which is pivotally connected to the wall of the root and means for moving the capturing arm from a position securing the associated leaf against the wall to a position permitting the leaf to pivot away from the wall to allow the joined members to separate.

42. A release mechanism, as claimed in claim 41, further comprising a leaf ejection device comprising an ejecting arm positionable between the leaf and the wall and connected to the capturing arm movement means for movement therewith so that when the capturing arm is moved to a position permitting the leaf to pivot away from the wall the ejection member forces the associated leaf away from the wall to allow the joined members to separate.

43. A release mechanism for releasably connecting two members at their ends comprising;
   a. a plurality of rigid leaves pivotally connected in an opposing relationship to each other and to one of the members to be joined adjacent to its end and extending beyond such end, each leaf having an inner surface which defines a recess therein, the leaves capable of completely surrounding the end of the abutting member to be joined with each leaf having lateral edges which abut the lateral edges of the adjacent members to prevent relative rotation of the members to be joined;
   b. a plurality of rigid elongated pivoting members each pivotally connected within a recess of a leaf with a first engaging end having a rounded surface opposite the pivot connection and extending from the recess towards the member to which and the leaves are connected;
   c. a root member connected to the second member to be joined at its end having a plurality of planar walls against which the leaves may fold, having an end surface which abuts the end of the opposite first member to be joined to transmit compression forces, and having a plurality of projections each extending from a wall and each having an engaging surface which is planar and substantially normal to the walls with its face directed away from the abutting end of the root member so that when the leaves are folded against the walls of the opposite member to be joined with the engaging ends of the pivot members against the engaging surfaces of the projections the ends of the members to be joined are held together; and
   d. means for releasably securing the leaves against movement away from the walls to prevent separation of the joined members.

* * * * *